United States Patent
Zheng et al.

(10) Patent No.: US 9,262,523 B2
(45) Date of Patent: Feb. 16, 2016

(54) ENHANCEMENT OF TOUCH USER EXPERIENCES

(71) Applicant: Adobe Systems Incorporated, San Jose, CA (US)

(72) Inventors: Jian Zheng, Daly City, CA (US); Rupen Chanda, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 227 days.

(21) Appl. No.: 13/663,093

(22) Filed: Oct. 29, 2012

(65) Prior Publication Data

US 2014/0123016 A1    May 1, 2014

(51) Int. Cl.
  *G06F 3/041*  (2006.01)
  *G06F 3/048*  (2013.01)
  *G06F 17/30*  (2006.01)

(52) U.S. Cl.
  CPC ................ *G06F 17/30861* (2013.01)

(58) Field of Classification Search
  None
  See application file for complete search history.

(56) References Cited

U.S. PATENT DOCUMENTS

| 8,639,544 | B1* | 1/2014 | Flemma, Jr. ............... 705/7.11 |
| 2008/0092071 | A1* | 4/2008 | Chiu .............................. 715/764 |
| 2009/0172560 | A1* | 7/2009 | Cole et al. .................... 715/744 |
| 2012/0174121 | A1* | 7/2012 | Treat et al. ................... 719/318 |
| 2012/0192118 | A1* | 7/2012 | Migos et al. ................. 715/863 |
| 2013/0009915 | A1* | 1/2013 | Hering .......................... 345/178 |
| 2013/0151944 | A1* | 6/2013 | Lin ................................ 715/234 |
| 2013/0174100 | A1* | 7/2013 | Seymour et al. ............ 715/863 |
| 2013/0226715 | A1* | 8/2013 | Lee et al. .................... 705/14.73 |

OTHER PUBLICATIONS www.ehow.com/how_8716259_disable-clicking-iframe.html, Jan. 25, 2012.*

* cited by examiner

*Primary Examiner* — Matt Kim
*Assistant Examiner* — Mahelet Shiberou
(74) *Attorney, Agent, or Firm* — Kilpatrick Townsend & Stockton LLP

(57) ABSTRACT

One exemplary embodiment involves a computer-implemented method that comprises receiving, via a touch display, a touch down event on an object depicted on a user interface rendered on the touch display. The embodiment involves determining whether to provide access to a complete set of actions responsive to the touch down event based at least in part on whether the object comprises an advertisement. Additionally, the embodiment may also involve determining whether to provide access to the complete set of actions responsive to the touch down event based at least in part on whether the object is associated with one or more listeners. Then, the embodiment involves implementing one or more accessible actions responsive to the touch down event.

21 Claims, 6 Drawing Sheets

ENHANCEMENT OF TOUCH USER EXPERIENCES

FIELD

This disclosure relates generally to computer software and more particularly relates to the creation, modification, use, and distribution of electronic content.

BACKGROUND

Touch computing devices are operated by providing one or more inputs via a touch display associated with the touch computing device. For example, a user operating the touch computing device may use a finger, a stylus, and/or other device to provide one or more inputs to the touch computing device. The user may operate the touch computing device to access web content such as news, media, and/or other content that is rendered on a touch display screen of the touch computing device. For example, the web content may be received over the internet, intranet, and/or some other network for accessing the web content. In some situations, the web content may include advertisements. For example, the advertisements may include one or more banners, hyperlinks, and/or other types of advertisement content.

SUMMARY

Disclosed are embodiments for receiving, on a touch computing device, a touch down event on a display depicting content rendered by a browser; determining whether a manipulation mode of the browser indicates a restricted mode; and responsive to the determination that the manipulation mode of the browser indicates a restricted mode, restrict access to a subset of actions responsive to the touch down.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
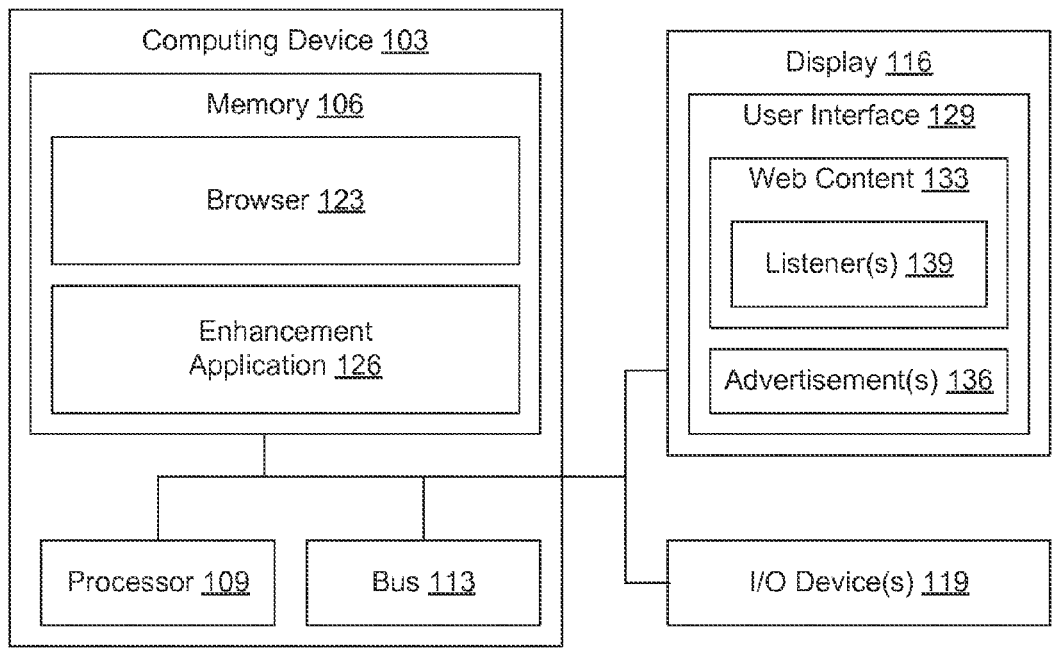
FIG. 1 is a block diagram depicting exemplary computing devices in an exemplary computing environment for implementing certain embodiments.

Methods and systems are disclosed for an enhancement application that determines whether to provide access to a full set of actions responsive to touch inputs received via a touch screen of a touch computing display. In one embodiment, a user operating the touch computing device may access web content that includes advertisements depicted on the display in conjunction with the web content. The web content and the advertisements may be depicted on a user interface rendered on the display. A user operating the touch computing device provides a touch input via a touch display screen associated with the display. For example, the user operating the touch computing device provides a touch down event via a finger, a stylus, and/or another device. The touch down events may include a number of gestures such a scrolling gesture, a swiping gesture, a pinching gesture, a zooming in gesture, a zooming out gesture, a panning gesture, and/or other types of gestures. Additionally, the touch down input may also include a selection of a hyperlink, a button, and/or an object depicted in the user interface. The browser that rendered the user interface receives the touch down event and implements one or more actions based at least in part on the touch down event.

In some instances, the user provides the touch down event at an object included on the user interface. For example, the user many provide a touch down event to scroll the web content rendered on the display. In one embodiment, the user provides the touch down event, i.e. a scrolling gesture, at an object included in the user interface. The object may be associated with one or more listeners that are configured to respond upon receiving a touch down event. For example, the object may be an advertisement that is configured to transmit a request to access other web content upon receipt of a touch down event. As another example, the object may be a media object that is configured to playback media upon receipt of a touch down event. Thus providing a scrolling gesture at an object that is associated with listeners may result in an action other than a scrolling action.

In one embodiment, the enhancement application determines to restrict access to a subset of actions responsive to the touch down event based at least in part on whether an object where the touch down event is received comprises an advertisement. For example, enhancement application may determine that the object includes an advertisement based on metadata associated with the object. In another embodiment, the enhancement application determines to restrict access to the set of actions responsive to the touch down event based at least in part on whether the object where the touch down event is received is associated with one or more listeners. For example, the enhancement application determines whether the listeners include a touch down handler and a touch move handler, and whether the listeners include a mouse down handler and a mouse move handler. Upon determining to restrict access, the enhancement application may transmit an indication to the browser to restrict access to the subset of actions responsive to the touch down event. The browser may then implement one or more accessible actions responsive to the touch down event.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 is a block diagram depicting an exemplary computing device in an exemplary computing environment for implementing certain embodiments. The methods and systems disclosed herein are also applicable on other computing systems and environments. The environment shown in FIG. 1 includes a computing device 103 having a memory 106, a processor 109, a bus 113, a display 116, and a plurality of input/output devices 119. In one embodiment, the input/output device 119 may include a number of external or internal devices such as a mouse, a CD-ROM, DVD, a keyboard, a display, audio speakers, one or more microphones, a stylus, or any other input or output devices. Additionally, the computing device 103 may be a personal computing device, a mobile device, or any other type of electronic devices appropriate for providing one or more of the features described herein. Further, the computing device 103 may be a touch computing device, such as a tablet computer, that includes a touch screen for receiving input. In this example, the input/output device 119 also includes the touch screen for receiving input.

As used here, the term "device" refers to any computing or other electronic equipment that executes instructions and includes any type of processor-based equipment that operates an operating system or otherwise executes instructions. A device will typically include a processor 109, which may comprise one or more processors, that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tables, laptop computers, tablet computers, Internet appliances, other processor-based devices, and television viewing devices. The exemplary computing device 103 may be used as special purpose computing devices to provide specific functionality offered by applications and modules.

As used herein, the term "application" refers to any program instructions or other functional components that execute on a device. An application may reside in the memory 106 of a device that executes the application. As is known to one of skill in the art, such applications may be resident in any suitable computer-readable medium and execute on a suitable processor. For example, as shown the computing device 103 has a computer-readable medium such as the memory 106 coupled to the processor 109 that executes computer-executable program instructions and/or accesses stored information. Such a processor 109 may include a microprocessor, an ASIC, a state machine, or other processor, and can be of any number of computer processors. Such processors include, or may be in communication with, a computer-readable medium which stores instructions that, when executed by the processor, cause the processor to perform the steps described herein.

The memory 106 represents a computer-readable medium that may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In one embodiment, the memory 106 includes a browser 123 and an enhancement application 126. In one embodiment, the browser 123 renders a user interface 129 that includes web pages, network pages, internet pages, and/or other types of web content 133 on the display 116. Additionally, the browser 123 may render a user interface 129 that includes advertisements 136, marketing content, and/or other types of promotional content. The browser 123 may be configured with one or more listeners 124 related to touch events. For example, a touch event may be an event associated with receiving a touch input via a touch screen of the display 116. The listeners 124 may be configured to handle and/or otherwise process touch down events, touch move events, mouse down events, mouse move events, and/or other types of touch inputs. The enhancement application 126 enhances touch interactions with the user interface 129 based at least in part on metadata associated with the web content 133. For example, the enhancement application 126 determines whether to provide access to a complete set of actions that are responsive to the touch down events or restrict access to a subset of actions that are responsive to the touch down events. The actions that that are responsive to the touch down events include pan, zoom, drag, swipe, and/or other actions.

A user operating the computing device 103 may access web content such as web pages, internet pages, network pages, or the like on a touch computing device 103. For example, the browser 123 may render web content 133 on the display 116 associated with the touch computing device 103. In some instances, the browser 123 may also render advertisements 136, promotional material, marketing content, and/or the like in addition to and/or instead of the web content 133. The user may manipulate the user interface 129 that includes the web content 133 and/or the advertisements 136 via one or more touch inputs. For example, the user may select on one or more hyperlinks, buttons, and/or other objects depicted on the user interface 129 via a finger, scroll the content by performing a scrolling gesture via the finger, zoom in and/or zoom out on the content by performing a zooming gesture via the finger and/or more than one finger, pan the content by performing a panning gesture via the finger, and/or otherwise manipulate the content depicted on the user interface 129.

In one embodiment, the user may provide a touch down event to manipulate the user interface 129 on a portion of the user interface 129 that corresponds to an advertisement 136. The browser 123 and/or some other executable associated with the advertisement 136 may interpret the touch down event to be a request to select the advertisement 136. For instance, the user may have intended for the touch down event to be a scrolling gesture for manipulating the user interface 129 to view a different portion of the user interface 129. However, the browser 123 and/or other executable associated with the advertisement 136 may instead interpret the touch down event to be a user selection, request to invoke the advertisement 136 and/or some other request to access the subject matter of the advertisement 136. In one embodiment, the enhancement application 126 determines whether to provide access to the complete set of actions responsive to touch events based at least in part on whether the portion of the user interface 129 that receives the touch down event is an advertisement 136. For example, the enhancement application 126 may restrict access to a subset of the actions responsive to touch events, such as pinch gestures, zoom gestures, and scroll gestures, when the touch event is received at an advertisement 136.

Additionally, the enhancement application 126 may determine to restrict access to the subset of actions responsive to touch events when the portion of the user interface 129 that receives the touch event comprises one or more listeners 139. For example, the web content 133 depicted on the user interface 129 may be embedded with, include, and/or otherwise be associated with listeners 139 that handle and/or otherwise process touch down events. For example, the listeners 139 may include a touch down handler, a touch move handler, a mouse down handler, a mouse down handler, and/or other types of listeners 139 that process touch down events. The enhancement application 126 determines whether the web content 133 includes one or more listeners 139 and in response, restricts access to the subset of actions responsive to the touch down events. For example, the enhancement application 126 may determine whether the web content 133 includes a touch down handler and a touch move handler, or if there is no touch down handler, the enhancement application 126 may determine whether the web content 133 includes a mouse down handler and a mouse move handler. Responsive to the determination, the enhancement application 126 may restrict access to the subset of actions responsive to the touch down events.

In one embodiment, the enhancement application 126 may configure a manipulation mode associated with the browser 123 based at least in part on whether to restrict access to the subset of actions responsive to the touch events. For instance, the enhancement application 126 may configure the manipulation mode of the browser 123 to be "independent" when the enhancement application 126 determines to restrict access to the subset of actions responsive to the touch events. Additionally, the enhancement application 126 may configure the manipulation mode of the browser 123 to be "dependent" when the enhancement application 126 does not determine to restrict access to the subset of actions responsive to the touch events.

Figure 2:
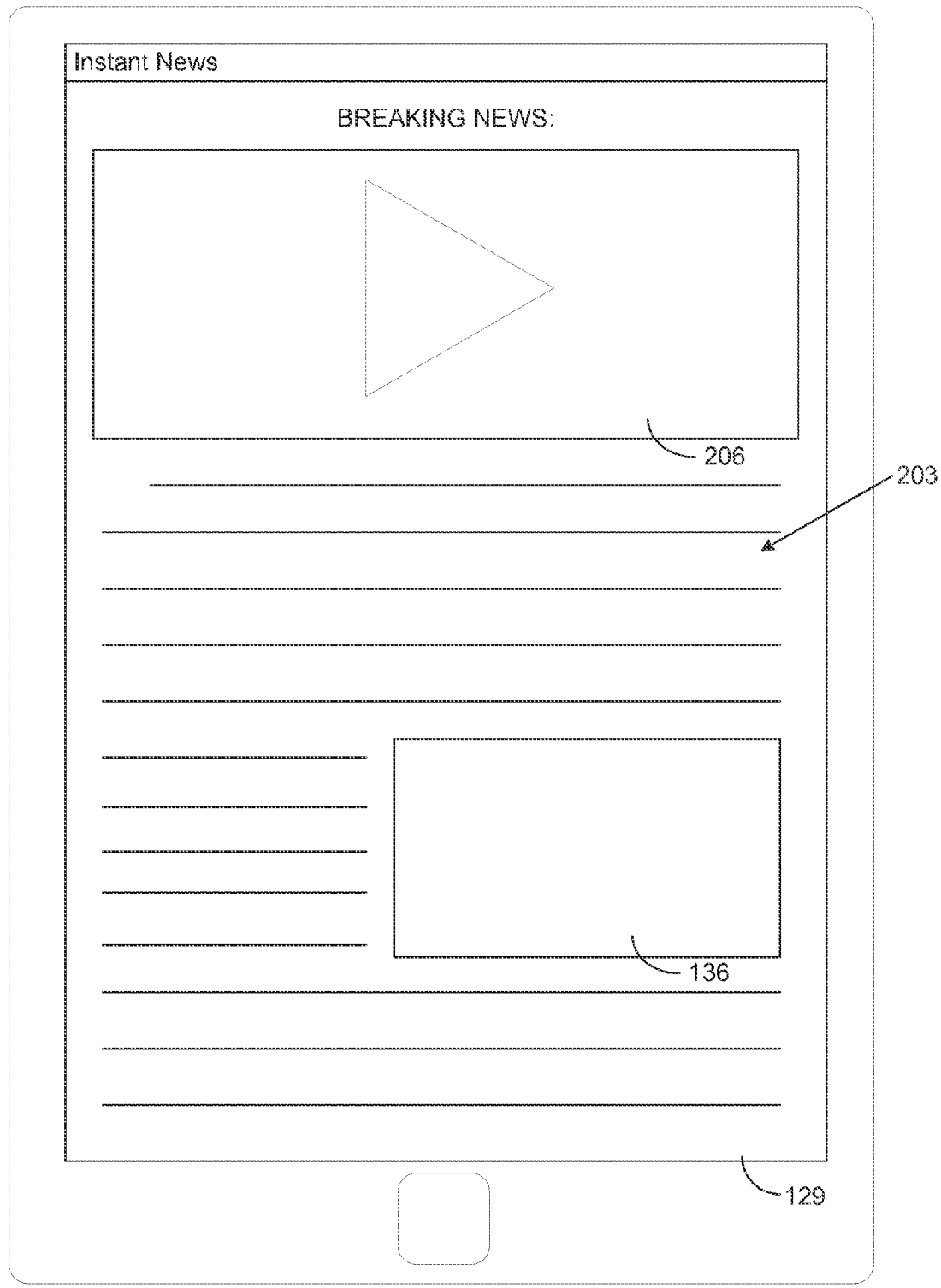
FIG. 2 illustrates an exemplary user interface that includes web content rendered by a browser on a display of a touch computing device.

FIG. 2 shows one example of a user interface 129 according to certain embodiments of the present disclosure that is rendered on the display 116. The user interface 129 shown in FIG. 2 includes a user interface 129 rendered by the browser 123 (FIG. 1) on the display 116 (FIG. 1) of a touch computing device 103. In this example, the user interface 129 depicts web content 133 that includes news 203 and a video object 206. Additionally, the user interface 129 depicts an advertisement 136. A user operating the touch computing device 103 may manipulate the user interface 129 by providing a touch down event via an input such as a finger, a stylus, and/or another device. For example, the user may wish to select the advertisement 136, play the video object 206, scroll the news 203, zoom in and/or zoom out on the news 203, and/or otherwise manipulate the web content 133 and advertisement 136 depicted on the display 116.

In one embodiment, the user may provide a touch event, such as a scrolling gesture, at a location on the user interface 129 that corresponds to the advertisement 136. The browser 123 and/or some other executable associated with the advertisement 136 may inappropriately interpret the scrolling gesture on the advertisement 136 to be a request to access the subject matter of the advertisement 136. For instance, the browser 123 may interpret the scrolling gesture to be a request to invoke a hyperlink associated with the advertisement 136 and may render subject matter associated with the advertisement 136 in response to the gesture. The enhancement application 126 determines that the scrolling gesture is received at the advertisement 136 and may prevent access to the action responsive to a scrolling gesture, such as scrolling the web content 133. In response to the scrolling gesture, the browser 123 may not interpret the gesture to be a request to invoke the advertisement 136. In another embodiment, the browser 123 may be unresponsive to the scrolling gesture when received at the advertisement, may not interpret the scrolling gesture, and/or perform some other action not related to accessing the subject matter of the advertisement 136.

Additionally, the user may provide a touch event, such as the scrolling gesture or zooming gesture, at a location on the user interface 129 that corresponds to the video object 206. The browser 123 and/or some other executable associated with the video object 206 may inappropriately interpret the scrolling gesture on the video object 206 to be a request to play the video associated with the video object 206. The enhancement application 126 determines that the scrolling gesture is received at a portion of the user interface 129 that is associated with one or more listeners 139 (FIG. 1). For example, the enhancement application 126 may determine that one or more portions of the web content 133 is associated with listeners 139 based at least in part on metadata. The enhancement application 126 may identify listeners 139 such as a touch down handler, a touch move handler, a mouse down handler, a mouse move handler, and/or other listeners 139 that handle and/or process touch events. The enhancement application 126 determines that the scrolling gesture is received at a portion of the web content 133 that is associated with listeners 139 and may thereby prevent access to the action responsive to a scrolling gesture, such as scrolling the web content 133. In one embodiment, the enhancement application 126 may provide access to other actions responsive to other touch events received at the video object 206. For example, the user may provide a touch input to request to play the video associated with the video object 206. The browser 123 may then respond to the request to play the video because the response to the request to play the video may not be blocked by the enhancement application 126.

In one embodiment, the user may provide touch down event, such as a scrolling gesture, that lands on the advertisement 136 and continues on to the web content 203. For instance, the user may provide a scrolling gesture that corresponds to a swipe that starts on the advertisement 136 and ends on the web content 203. In this example, the enhancement application 126 determines that the scrolling gesture is received at the advertisement 136 because the touch down event occurs at the advertisement 136. Accordingly, the enhancement application 126 may prevent access to the action responsive to a scrolling gesture, such as scrolling the web content 133, as discussed above.

Figure 3:
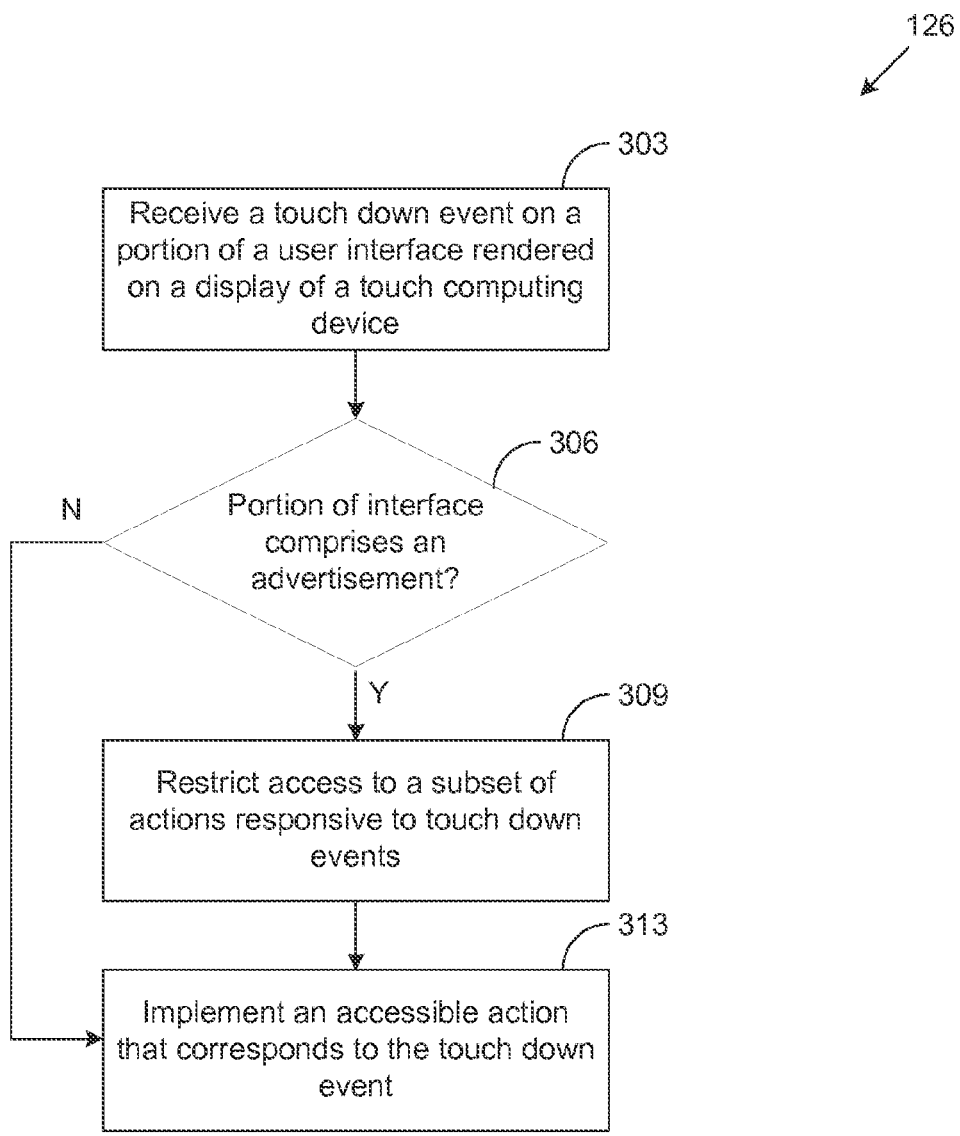
FIG. 3 is a flowchart illustrating an exemplary method for determining whether to restrict access to a subset of actions responsive to a touch down event based at least in part on whether the interface comprises an advertisement.

FIG. 3 is a flowchart that provides one example of the operation of a portion of the enhancement application 126 according to certain embodiments. It is understood that the flowchart of FIG. 3 provides merely an example of the many different types of functional arguments that may be employed to implement the operation of the portion of the enhancement application 126 as described herein. As an alternative, the flowchart of FIG. 3 may be viewed as depicting an example of steps of a method implemented in the touch computing device 103 (FIG. 1) according to one or more embodiments.

Beginning with step 303, the enhancement application 126 receives a touch down event on a portion of the user interface 129 (FIG. 1) rendered on a display 116 (FIG. 1) of the touch computing device 103. For example, the touch down event may be a selection of an object included on the user interface 129, a scroll gesture, a zoom gesture, a pinch gesture, a pan gesture, a swipe gesture, and/or any other touch down event involving a finger, a stylus and/or another device. In one embodiment, another application, such as the browser 123 (FIG. 1) being implemented by the touch computing device 103 may receive the touch down event. In this embodiment, the enhancement application 126 may detect receipt of a touch down event.

Next, in step 306, the enhancement application 126 determines whether the portion of the user interface 129 where the touch down event is received includes an advertisement 136 (FIG. 1). For example, the user interface 129 where the touch down event is received may include objects such as web content 133, In one embodiment, the enhancement application 126 may determine whether the portion of the interface includes an advertisement based at least in part on a metadata associated with the objects in the portion of the user interface 129 where the touch down event is received. For example, the advertisement 136, promotional material, and the like may include metadata such as a click tag parameter, and/or another parameter included in the metadata of the advertisement 136.

If the enhancement application 126 determines that the portion of the interface where the touch event is received includes an advertisement 136, then the enhancement application 126 advances to step 309. In step 309, the enhancement application 126 restricts access to a subset of the actions that are responsive to touch down events. For example, the subset of actions to which access is restrict may include a panning action, a scrolling action, a zooming action, a dragging action, a swiping action, and/or other types of actions.

Next, in step 313, the enhancement application 126 implements one or more accessible actions that are responsive to the touch down event. For example, the touch down event may be a user selection of an object on the user interface 129. An action responsive to the user selection may be invoking a hyperlink associated with the object, and/or another action. As another example, the touch down event may be a scrolling gesture on an advertisement 136. However, the enhancement application 126 may have previously restricted access to an action responsive to touch events such as a scrolling gesture. In one embodiment, the browser 123 and/or another application being implemented on the touch computing device 103 may implement the actions that are responsive to the touch down event. In this embodiment, the enhancement application 126 may prevent the implementation of an action if the respective action was previously restricted, as discussed in step 309.

Returning to step 306, if the enhancement application determines that the portion of the interface where the touch event is received does not include an advertisement 136, then the enhancement application 126 advances to step 313. In this embodiment, no actions responsive to touch down events were restricted in step 309. Accordingly, a complete set of actions that are responsive to touch down events are accessible for implementation.

Figure 4:
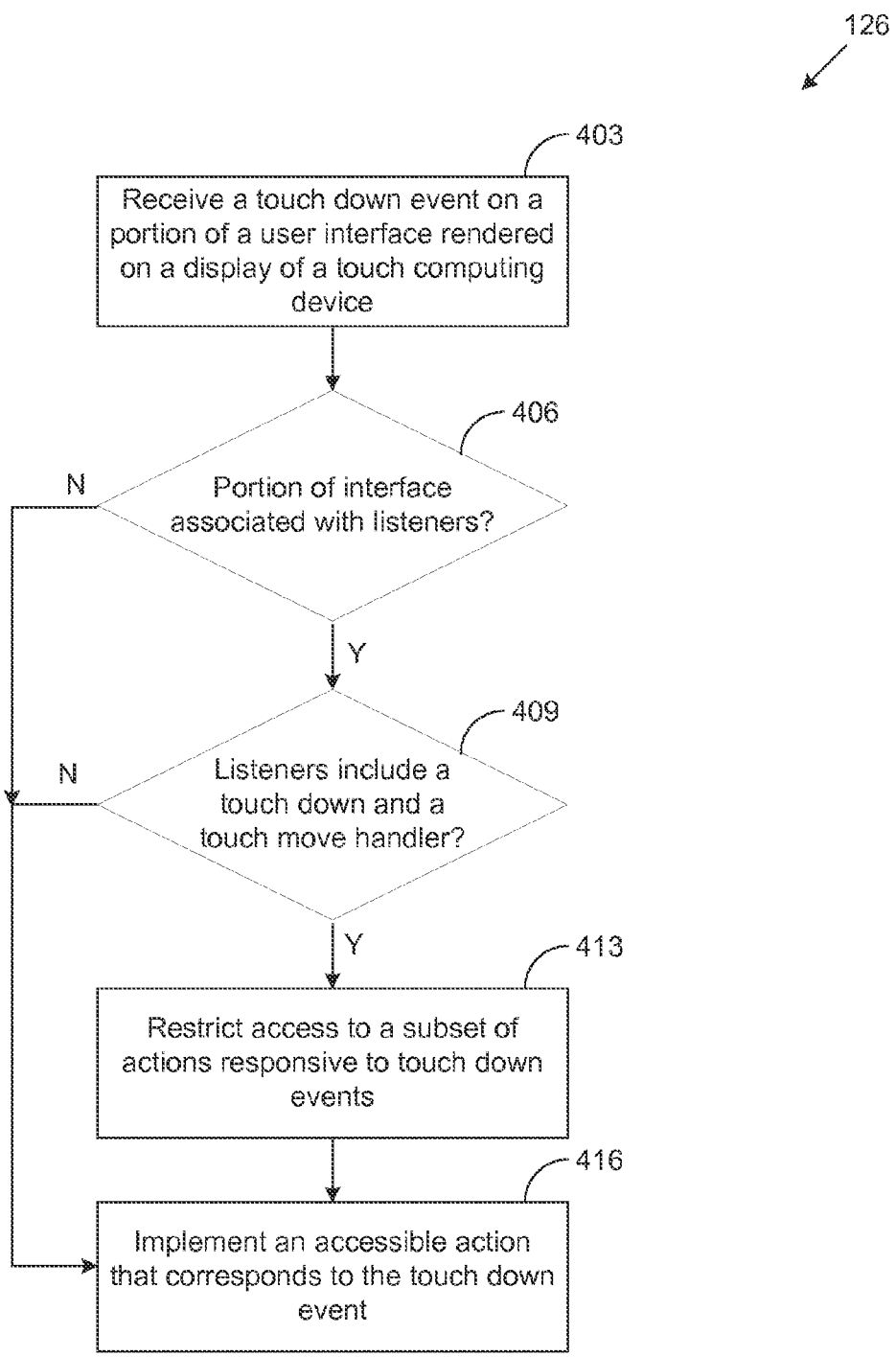
FIG. 4 is a flowchart illustrating one exemplary method for determining whether to restrict access to a subset of actions responsive to a touch down event based at least in part on whether the interface is associated with listeners.

FIG. 4 is a flowchart that provides one example of the operation of a portion of the enhancement application 126 according to certain embodiments. It is understood that the flowchart of FIG. 4 provides merely an example of the many different types of functional arguments that may be employed to implement the operation of the portion of the enhancement application 126 as described herein. As an alternative, the flowchart of FIG. 4 may be viewed as depicting an example of steps of a method implemented in the touch computing device 103 (FIG. 1) according to one or more embodiments.

Beginning with step 403, the enhancement application 126 receives a touch down event on a portion of the user interface 129 (FIG. 1) rendered on a display 116 (FIG. 1) of the touch computing device 103. For example, the touch down event may be a selection of an object included on the user interface 129, a scroll gesture, a zoom gesture, a pinch gesture, a pan gesture, a swipe gesture, and/or any other touch down event involving a finger, a stylus and/or another device. In one embodiment, another application, such as the browser 123 (FIG. 1) being implemented by the touch computing device 103 may receive the touch down event. In this embodiment, the enhancement application 126 may detect receipt of a touch down event.

Next, in step 406, the enhancement application 126 determines whether the portion of the user interface 129 where the touch down event is received is associated with one or more listeners 139 (FIG. 1). For example, the portion of the user interface 129 where the touch down event is received may include web content 133, such as content powered by Action-Script®, available from Adobe Systems Inc., and/or other software applications, that is associated with listeners 139. In particular, ActionScript® 3.0, available from Adobe Systems Inc., provides for associating listeners with objects rendered on a display 116. In one embodiment, the enhancement application 126 may parse, query and/or otherwise search code associated with the web content 133 to determine whether there are any associated listeners 139.

If the enhancement application 126 determines that the portion of the user interface 129 where the touch down event is received is associated with one or more listeners 139, then the enhancement application advances to step 409. In step 409, the enhancement application 126 determines whether the listeners 139 include at least a touch down handler and a touch move handler. For example, a touch down handler may be configured to recognize, listen for, and/or otherwise process a touch down event. Similarly, a touch move handler may be configured to recognize, listen for, and/or otherwise process a touch move event. In one embodiment, the enhancement application 126 may parse, query and/or otherwise search code associated with the web content 133 to determine whether there is a touch down handler and a touch move handler.

If the enhancement application 126 determines that the listeners 139 include at least a touch down handler and a touch move handler, then the enhancement application 126 advances to step 413. In step 413, the enhancement application 126 restricts access to a subset of the actions that are responsive to touch down events. For example, the subset of actions to which access is restricted may include a panning action, a scrolling action, a zooming action, a dragging action, a swiping action, and/or other types of actions.

Next, in step 416, the enhancement application 126 implements one or more accessible actions that are responsive to the touch down event. For example, the touch down event may be a user selection of an object on the user interface 129. An action responsive to the user selection may be invoking a hyperlink associated with the object, and/or another action. As another example, the touch down event may be a scrolling gesture on an advertisement 136. However, the enhancement application 126 may have previously restricted access to an action responsive to touch events such as a scrolling gesture. In one embodiment, the browser 123 and/or another application being implemented on the touch computing device 103 may implement the actions that are responsive to the touch down event. In this embodiment, the enhancement application 126 may prevent the implementation of an action if the respective action was previously restricted, as discussed in step 413.

Returning to step 406, if the enhancement application 126 determines that the portion of the user interface 129 where the touch down event is received is not associated with one or more listeners 139, then the enhancement application 126 advances to step 416. In step 416, the enhancement application 126 implements one or more accessible actions that are responsive to the touch down event, as discussed above. In one embodiment, the enhancement application 126 may determine whether the portion of the user interface 129 where the touch down event was received includes an advertisement 136 (FIG. 1) prior to advancing to step 416 to determine whether to restrict access to a subset of actions responsive to the touch down event, as discussed in FIG. 3.

Returning to step 409, if the enhancement application 126 determines that the listeners 139 do not include a touch handler and a touch move handler, then the enhancement application 126 advances to step 416. In step 416, the enhancement application 126 implements one or more accessible actions that are responsive to the touch down event, as discussed above.

Figure 5:
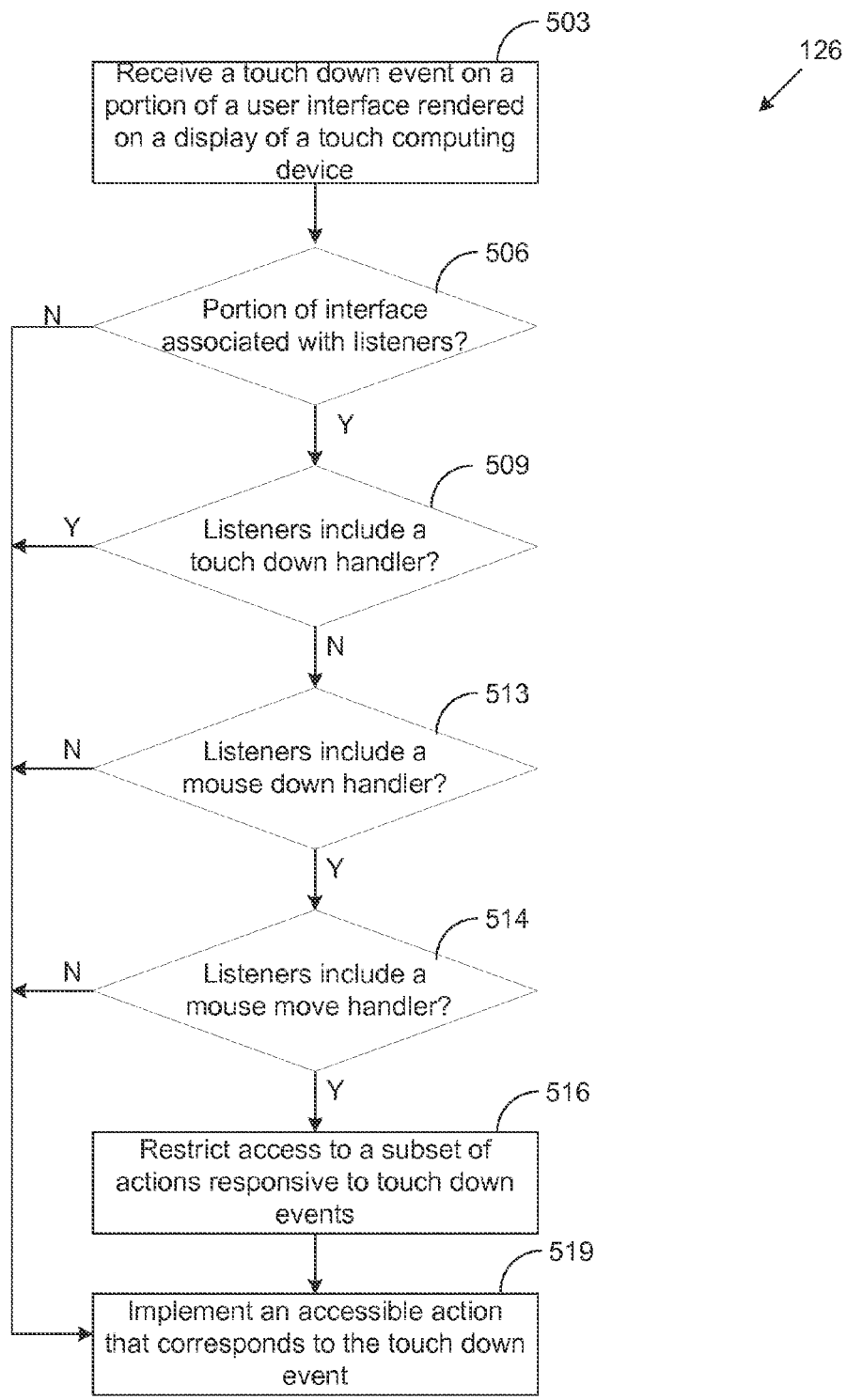
FIG. 5 is a flowchart illustrating another exemplary method for determining whether to restrict access to a subset of actions responsive to a touch down event based at least in part on whether the interface is associated with listeners.

FIG. 5 is a flowchart that provides one example of the operation of a portion of the enhancement application 126 according to certain embodiments. It is understood that the flowchart of FIG. 5 provides merely an example of the many different types of functional arguments that may be employed to implement the operation of the portion of the enhancement application 126 as described herein. As an alternative, the flowchart of FIG. 5 may be viewed as depicting an example of steps of a method implemented in the touch computing device 103 (FIG. 1) according to one or more embodiments.

Beginning with step 503, the enhancement application 126 receives a touch down event on a portion of the user interface 129 (FIG. 1) rendered on a display 116 (FIG. 1) of the touch computing device 103. For example, the touch down event may be a selection of an object included on the user interface 129, a scroll gesture, a zoom gesture, a pinch gesture, a pan gesture, a swipe gesture, and/or any other touch down event involving a finger, a stylus and/or another device. In one embodiment, another application, such as the browser 123 (FIG. 1) being implemented by the touch computing device 103 may receive the touch down event. In this embodiment, the enhancement application 126 may detect receipt of a touch down event.

Next, in step 506, the enhancement application 126 determines whether the portion of the user interface 129 where the touch down event is received is associated with one or more listeners 139 (FIG. 1). For example, the portion of the user interface 129 where the touch down event is received may include web content 133, such as ActionScript, that is associated with listeners 139. In one embodiment, the enhancement application 126 may parse, query and/or otherwise search code associated with the web content 133 to determine whether there are any associated listeners 139.

If the enhancement application 126 determines that the portion of the user interface 129 where the touch down event is received is associated with one or more listeners 139, then the enhancement application advances to step 509. In step 509, the enhancement application 126 determines whether the associated listeners 139 include a touch down handler. For example, a touch down handler may be configured to recognize, listen for, and/or otherwise process a touch down event. In one embodiment, the enhancement application 126 may parse, query and/or otherwise search code associated with the web content 133 to determine whether there is a touch down handler. If the enhancement application 126 determines that the associated listeners 139 do not include a touch down handler, then the enhancement application 126 advances to step 513.

In step 513, the enhancement application 126 determines whether the listeners 139 include a mouse down handler. For example, a mouse down handler may be configured to recognize, listen for, and/or otherwise process a mouse down event. In one embodiment, the enhancement application 126 may parse, query and/or otherwise search code associated with the web content 133 to determine whether there is a mouse down handler and a touch mouse handler. If the enhancement application 126 determines that the listeners 139 includes a mouse down handler, then the enhancement application 126 advances to step 514.

In step 514, the enhancement application 126 determines whether the listeners 139 include a mouse move handler. For example, a mouse down handler may be configured to recognize, listen for, and/or otherwise process a mouse move event. In one embodiment, the enhancement application 126 may parse, query and/or otherwise search code associated with the web content 133 to determine whether there is a mouse move handler. If the enhancement application 126 determines that the listeners 139 includes a mouse move handler, then the enhancement application 126 advances to step 516. In step 516, the enhancement application 126 restricts access to a subset of the actions that are responsive to touch down events. For example, the subset of actions to which access is restrict may include a panning action, a scrolling action, a zooming action, a dragging action, a swiping action, and/or other types of actions.

Next, in step 519, the enhancement application 126 implements one or more accessible actions that are responsive to the touch down event. For example, the touch down event may be a user selection of an object on the user interface 129. An action responsive to the user selection may be invoking a hyperlink associated with the object, and/or another action. As another example, the touch down event may be a scrolling gesture on an advertisement 136. However, the enhancement application 126 may have previously restricted access to an action responsive to touch events such as a scrolling gesture. In one embodiment, the browser 123 and/or another application being implemented on the touch computing device 103 may implement the actions that are responsive to the touch down event. In this embodiment, the enhancement application 126 may prevent the implementation of an action if the respective action was previously restricted, as discussed in step 516.

Returning to step 506, if the enhancement application 126 determines that the portion of the user interface 129 where the touch down event is received is not associated with one or more listeners 139, then the enhancement application 126 advances to step 519. In step 519, the enhancement application 126 implements one or more accessible actions that are responsive to the touch down event, as discussed above. In one embodiment, the enhancement application 126 may determine whether the portion of the user interface 129 where the touch down event was received includes an advertisement 136 (FIG. 1) prior to advancing to step 416 to determine whether to restrict access to a subset of actions responsive to the touch down event, as discussed in FIG. 3.

Returning to step 509, if the enhancement application 126 determines that the listeners 139 include a touch down handler, then the enhancement application 126 advances to step 519. In step 519, the enhancement application 126 implements one or more accessible actions that are responsive to the touch down event, as discussed above. In one embodiment, the enhancement application 126 may determine if the listeners 139 also include a touch move handler prior to advancing to step 519 to determine whether to restrict access to a subset of actions, as discussed in FIG. 4.

Returning to step 513, if the enhancement application 126 determines that the listeners 139 do not include a mouse handler and a mouse move handler, then the enhancement application 126 advances to step 519. In step 519, the enhancement application 126 implements one or more accessible actions that are responsive to the touch down event, as discussed above.

Figure 6:
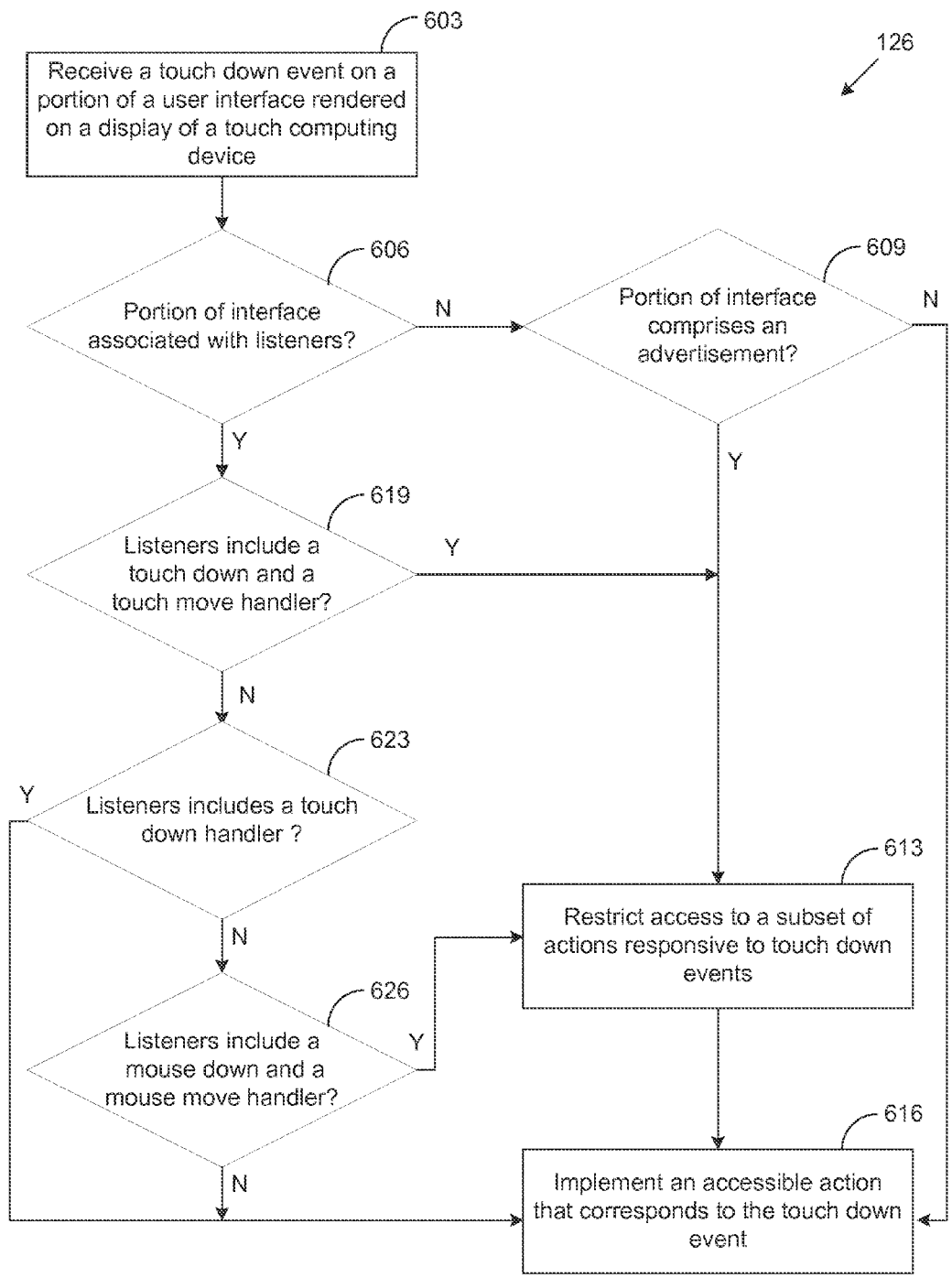
FIG. 6 is a flowchart illustrating an exemplary method for determining whether to restrict access to a subset of actions responsive to a touch down event based at least in part on whether the interface comprises an advertisement and whether the interface is associated with listeners.

FIG. 6 is a flowchart that provides one example of the operation of a portion of the enhancement application 126 according to certain embodiments. It is understood that the flowchart of FIG. 6 provides merely an example of the many different types of functional arguments that may be employed to implement the operation of the portion of the enhancement application 126 as described herein. As an alternative, the flowchart of FIG. 6 may be viewed as depicting an example of steps of a method implemented in the touch computing device 103 (FIG. 1) according to one or more embodiments.

Beginning with step 603, the enhancement application 126 receives a touch down event on a portion of the user interface 129 (FIG. 1) rendered on a display 116 (FIG. 1) of the touch computing device 103. For example, the touch down event may be a selection of an object included on the user interface 129, a scroll gesture, a zoom gesture, a pinch gesture, a pan gesture, a swipe gesture, and/or any other touch down event involving a finger, a stylus and/or another device. In one embodiment, another application, such as the browser 123 (FIG. 1) being implemented by the touch computing device 103 may receive the touch down event. In this embodiment, the enhancement application 126 may detect receipt of a touch down event.

Next, in step 606, the enhancement application 126 determines whether the portion of the user interface 129 where the touch down event is received is associated with one or more listeners 139 (FIG. 1). For example, the portion of the user interface 129 where the touch down event is received may include web content 133, such as ActionScript®, that is associated with listeners 139. In one embodiment, the enhancement application 126 may parse, query and/or otherwise search code associated with the web content 133 to determine whether there are any associated listeners 139.

If the enhancement application 126 determines that the portion of the user interface 129 where the touch down event is received is not associated with one or more listeners 139, then the enhancement application advances to step 609. In step 609, the enhancement application 126 determines whether the portion of the user interface 129 where the touch down event is received includes an advertisement 136 (FIG. 1), as described above with respect to FIG. 3. If the enhancement application 126 determines that the portion of the interface where the touch event is received includes an advertisement 136, then the enhancement application 126 advances to step 613. In step 613, the enhancement application 126 restricts access to a subset of the actions that are responsive to touch down events. For example, the subset of actions to which access is restrict may include a panning action, a scrolling action, a zooming action, a dragging action, a swiping action, and/or other types of actions.

Next, in step 616, the enhancement application 126 implements one or more accessible actions that are responsive to the touch down event. For example, the touch down event may be a user selection of an object on the user interface 129. An action responsive to the user selection may be invoking a hyperlink associated with the object, and/or another action. As another example, the touch down event may be a scrolling gesture on an advertisement 136. However, the enhancement application 126 may have previously restricted access to an action responsive to touch events such as a scrolling gesture. In one embodiment, the browser 123 and/or another application being implemented on the touch computing device 103 may implement the actions that are responsive to the touch down event. In this embodiment, the enhancement application 126 may prevent the implementation of an action if the respective action was previously restricted, as discussed in step 613.

Returning to step 609, if the enhancement application 126 determines that the portion of the interface where the touch event is received includes an advertisement 136, then the enhancement application 126 advances to step 616. In one embodiment, no actions responsive to touch down events were restricted in step 613. Accordingly, a complete set of actions that are responsive to touch down events are accessible for implementation.

Returning to step 606, if the enhancement application 126 determines that the portion of the user interface 129 where the touch down event is received is associated with one or more listeners 139, then the enhancement application advances to step 619. In step 619, the enhancement application 126 determines whether the listeners 139 include at least a touch down handler and a touch move handler, as described above with respect to FIG. 4. If the enhancement application 126 determines that the listeners 139 include at least a touch down handler and a touch move handler, then the enhancement application 126 advances to step 613. In step 613, the enhancement application 126 restricts access to a subset of the actions that are responsive to touch down events, as previously discussed. Next, in step 616, the enhancement application 126 implements one or more accessible actions that are responsive to the touch down event, as discussed above.

Returning to step 619, if the enhancement application 126 determines that the listeners 139 do not include a touch down handler and a touch move handler, then the enhancement application 126 advances to step 623. In step 623, the enhancement application 126 determines whether the listeners 139 include a touch down handler. If the enhancement application 126 determines that the listeners 139 includes a touch down handler, then the enhancement application 126 advances to step 616 to implement an accessible action that corresponds to the touch down event. If the enhancement application 126 determines that the listeners 139 do not include a touch down handler, then the enhancement application 126 advances to step 626.

In step 626, the enhancement application 126, determines whether the listeners 139 include a mouse down handler and a mouse move handler. For example, the enhancement application 126 may query, search, parse, and/or otherwise identify the handlers from the code associated with the listeners 139. If the enhancement application 126 determines that the listeners 139 include a mouse down handler and a mouse move handler, then the enhancement application 126 advances to step 613. In step 613, the enhancement application 126 restricts access to a subset of the actions that are responsive to touch down events, as discussed above. Then, in step 616, the enhancement application 126 implements an accessible action that corresponds to the touch down event, as previously discussed. Returning to step 626, if the enhancement application 126 determines that the listeners 139 do not include the mouse down handler and the mouse move handler, then the enhancement application 126 proceeds to step 616 to implement an accessible action that corresponds to the touch down event.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   receiving, on a touch computing device, a touch down event on a display depicting content rendered by a browser supporting a plurality of actions responsive to touch inputs;
   determining, in the touch computing device, a mode for the browser based upon an examination of the content, wherein the examination includes at least one of:
      determining whether the content is associated with predetermined subject matter, and
      determining whether a portion of an interface of the browser on the display is configured by the content to include a plurality of listeners associated with touch events; and
   configuring the browser for a restricted mode when the examination determines that the content is associated with the predetermined subject matter or that the portion of the interface is configured to include the listeners associated with touch events, wherein the restricted mode comprises preventing access in the browser and in the content to at least one of a pinch action, a zoom action, and a scroll action responsive to the touch down event.

2. The computer-implemented method of claim 1, wherein the predetermined subject matter includes at least one of advertisement content, promotional content, or marketing content.

3. The computer-implemented method of claim 1, further comprising:
   configuring the browser for an unrestricted mode when the examination determines that the content is not associated with the predetermined subject matter and that the portion of the interface is not configured to include the listeners associated with touch events, wherein the unrestricted mode comprises providing access to a complete set of actions responsive to the touch down event.

4. The computer-implemented method of claim 1, further comprising:
   responsive to determining that the portion of the interface is configured to include the listeners, determining whether the listeners include a touch down handler and a touch move handler; and
   responsive to determining that the listeners include both of the touch down handler and the touch move handler, configuring the browser to be in the restricted mode.

5. The computer-implemented method of claim 1, further comprising:
   responsive to determining that the portion of the interface is configured to include the listeners, determining whether the listeners include a touch down handler;
   responsive to determining that the listeners do not include the touch down handler, determining whether the listeners include a mouse down handler and a mouse move handler; and
   responsive to determining that listeners include the mouse down handler and the mouse move handler, configuring the browser to be in the restricted mode.

6. The computer-implemented method of claim 1, wherein the listeners are provided by executable web content.

7. A touch computing device comprising:
a touch-sensitive display;
a processor for executing instructions of an application comprising one or more modules configured to perform the steps comprising:
receiving, via the touch-sensitive display, a touch down event on a portion of an interface depicting content rendered by a browser supporting a plurality of actions responsive to touch inputs;
determining a mode for the browser based upon an examination of the content, wherein the examination includes at least one of:
determining whether the content is associated with predetermined subject matter, and
determining whether the portion of the interface is configured to include a plurality of listeners associated with touch events;
configuring the browser for a restricted mode when the examination determines the content is associated with the predetermined subject matter or that the portion of the interface is configured to include the listeners associated with touch events, wherein the restricted mode comprises preventing access in the browser and in the content to at least one of a pinch action, a zoom action, and a scroll action responsive to the touch down event.

8. The touch computing device of claim 7, further comprising:
configuring the browser for an unrestricted mode when the examination determines the content is not associated with the predetermined subject matter and that the portion of the interface is not configured to include the listeners associated with touch events, wherein the unrestricted mode comprises providing access to a complete subset of actions responsive to the touch down event.

9. The touch computing device of claim 7, further comprising:
responsive to determining that the portion of the interface is configured to include the listeners, determining whether the listeners include a touch down handler and a touch move handler; and
responsive to determining that the listeners include the touch down handler and the touch move handler, configuring the browser for the restricted mode.

10. The touch computing device of claim 7, further comprising:
responsive to determining that the portion of the interface is configured to include the listeners, determining whether the portion of the interface is associated with a touch down handler; and
responsive to determining that the portion of the interface is not associated with a touch down handler, determining whether the listeners include a mouse down handler and a mouse move handler; and
responsive to determining that the listeners include the mouse down handler and the mouse move handler, configuring the browser for the restricted mode.

11. The touch computing device of claim 8, further comprising:
responsive to determining that the portion of the interface is configured to include the listeners, determining whether the listeners include a touch down handler; and
responsive to determining that the listeners do not include the touch down handler, determining whether the listeners include a mouse down handler; and
responsive to determining that the listeners do not include the mouse down handler, configuring the browser for the unrestricted mode.

12. The touch computing device of claim 7, wherein the listeners are provided by executable web content.

13. The touch computing device of claim 7, wherein the predetermined subject matter comprises at least one of advertisement content, promotional content, or marketing content.

14. A non-transitory computer-readable medium on which is encoded program code, the program code comprising:
program code for receiving a touch down event on a portion of an interface accessible via a touch display, the interface depicting content rendered by a browser supporting a plurality of actions responsive to touch inputs;
program code for determining a mode for the browser based upon an examination of the content, wherein the examination includes at least one of:
determining whether the content is associated with predetermined subject matter, and
determining whether the portion of the interface is configured by the content to include a plurality of listeners associated with touch events;
program code for configuring the browser for a restricted mode when the examination determines the content is associated with the predetermined subject matter or that the portion of the interface is configured to include the listeners associated with touch events, wherein the restricted mode comprises preventing access in the browser and in the content to at least one of a pinch action, a zoom action, and a scroll action responsive to the touch down event; and
program code for performing at least one of the actions accessible to the browser, wherein the at least one action corresponds to the touch down event.

15. The non-transitory computer-readable medium of claim 14, wherein the predetermined subject matter comprises at least one of advertisement content, promotional content, and marketing content.

16. The non-transitory computer-readable medium of claim 14, wherein said determining whether the portion of the interface is configured to include the listeners comprises:
responsive to determining that the portion of the interface is configured to include the listeners, determining whether the listeners include a touch down handler and a touch move handler.

17. The non-transitory computer-readable medium of claim 14, further comprising:
program code for configuring the browser for an unrestricted mode when the examination determines the content is not associated with the predetermined subject matter and that the portion of the interface is not configured to include the listeners associated with touch events, wherein the unrestricted mode comprises providing access to a complete set of actions responsive to the touch down event.

18. The non-transitory computer-readable medium of claim 14, wherein said determining whether the portion of the interface is configured to include the listeners comprises:
responsive to determining that the portion of the interface is configured to include the listeners, determining whether the listeners include a mouse down handler and a mouse move handler.

19. The non-transitory computer-readable medium of claim 14, wherein the listeners include at least one of (i) a touch down handler and a touch move handler, and (ii) a mouse down handler and a mouse move handler.

20. The non-transitory computer-readable medium of claim 14, wherein the listeners are provided by executable web content.

21. The non-transitory computer-readable medium of claim 14, wherein once other content is rendered by the browser, determining the mode for the browser based upon an examination of the other content.

* * * * *